United States Patent [19]

Takatsu et al.

[11] Patent Number: 4,761,689
[45] Date of Patent: Aug. 2, 1988

[54] APPARATUS FOR DRIVING A SOLID STATE IMAGE PICKUP DEVICE

[75] Inventors: Norihiko Takatsu, Tokyo; Keita Kimura, Kawaguchi, both of Japan

[73] Assignee: Nippon Kogaku K. K., Tokyo, Japan

[21] Appl. No.: 927,156

[22] Filed: Nov. 5, 1986

[30] Foreign Application Priority Data

Nov. 11, 1985 [JP] Japan ................................. 60-252460

[51] Int. Cl.⁴ .............................................. H04N 3/14
[52] U.S. Cl. ............................ 358/213.22; 358/213.31
[58] Field of Search ..................... 358/213.19, 213.22, 358/213.26, 213.29, 213.31

[56] References Cited

U.S. PATENT DOCUMENTS 4,322,753 3/1982 Ishihara ........................ 358/213.19
4,597,013 6/1986 Matsumoto ..................... 358/213.26
4,603,343 7/1986 Matsumoto et al. ............ 358/213.26

Primary Examiner—Jin F. Ng
Assistant Examiner—Stephen Brinich
Attorney, Agent, or Firm—Shapiro and Shapiro

[57] ABSTRACT

An apparatus for making a video signal includes a solid state image pickup device having a plurality of first charge accumulation type photoelectric converting elements corresponding to the odd fields of the video signal, a plurality of second charge accumulation type photoelectric converting elements corresponding to the even field of the video signal, vertical transfer means, horizontal transfer means, first terminal means and second terminal means; output means for putting out a vertical blanking signal indicative of the vertical blanking period of the video signal, a first transfer pulse and a second transfer pulse; input means for alternately inputting the first and second transfer pulses to the first and second terminal means during each vertical blanking period and a generator for putting out a first driving pulse and a second driving pulse of a longer period than the first driving pulse to the vertical transfer means.

6 Claims, 7 Drawing Sheets

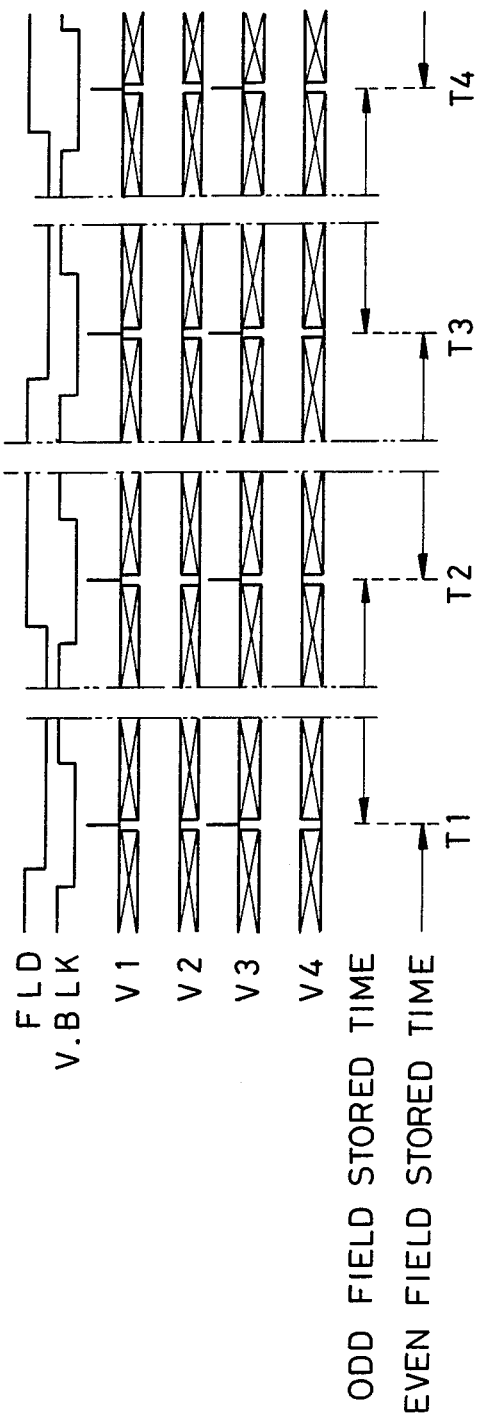

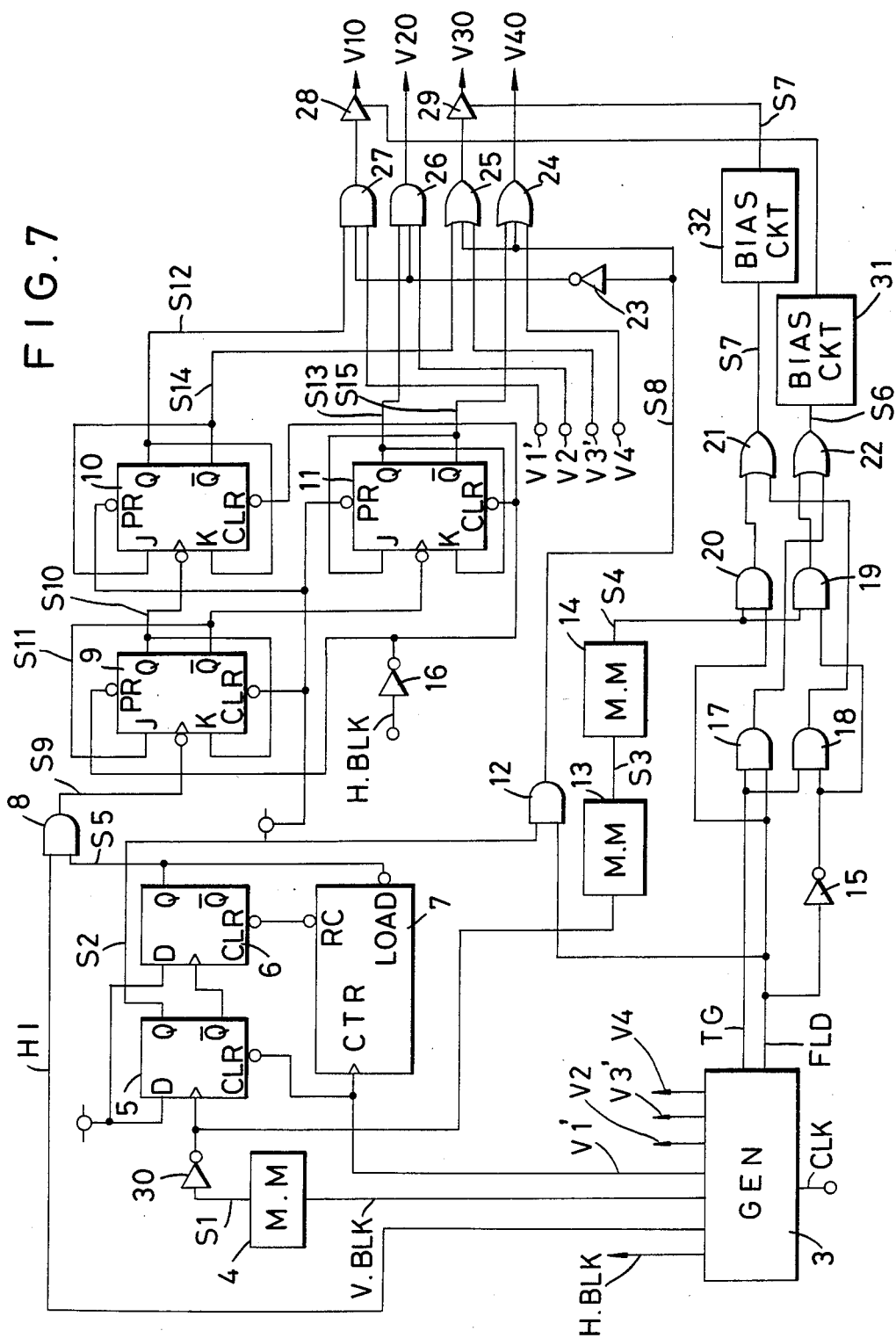

APPARATUS FOR DRIVING A SOLID STATE IMAGE PICKUP DEVICE

BACKGROUND OF THE INVENTION

1. Field of the Invention

This invention relates to an apparatus for driving a solid state image pickup device used in a color video camera provided with a single image pickup device.

2. Related Background Art

As the light-receiving accumulation modes of a solid state image pickup device used in a video camera, there are known the frame accumulation mode in which signal charges are accumulated in a charge accumulation type photoelectric converting element for one frame period (1/30 sec.) and the field accumulation mode in which signal charges are accumulated in a charge accumulation type photoelectric converting element for one field period (1/60 sec.).

FIG. 1 of the accompanying drawings, is a schematic view of an interline transfer CCD known as a solid state image pickup device, and arrows therein indicate the movement of signal charges from light-receiving portions 1 to vertical transfer portions 2 in the frame accumulation mode.

That is, solid-line arrows indicate the movement of signal charges in odd fields, and broken-line arrows indicate the movement of signal charges in even fields, and further, $\phi 1$–$\phi 4$ designate the four-phase driving signal electrodes of a vertical transfer CCD. A horizontal transfer portion 33 is a two-phase CCD and is driven by a horizontal transfer pulse applied to electrodes $\phi 5$ and $\phi 6$. The charges transferred by the horizontal transfer portion 33 are put out to the outside through an amplifier 34.

The driving in the frame accumulation mode is shown in the time chart of FIG. 2 of the accompanying drawings.

In FIG. 2, a frame synchronizing signal FLD is at a high level (hereinafter referred to as H level) for a period of time substantially corresponding to the transfer period of charges accumulated in the odd fields and at a low level (hereinafter referred to as L level) for a period of time substantially corresponding to the transfer period of charges accumulated in the even fields. V.BLK is a vertical blanking signal, and the period during which V.BLK is at L level is a vertical blanking period. Further, V1–V4 are electrode voltages corresponding to the transfer electrodes $\phi 1$–$\phi 4$.

As is apparent from FIG. 2, in the case of the frame accumulation mode, the voltage V1 of the electrode $\phi 1$ assumes the highest one of three levels at the timing of times T2, T4, ..., and as indicated by solid-line arrows in FIG. 1, the signal charges of the odd fields are transferred from the light-receiving portions 1 to the vertical transfer portions 2, whereafter they are read out as video signals. On the other hand, the voltage V3 of the electrode $\phi 3$ assumes the highest one of three levels at the timing of times T1, T3, ..., and as indicated by broken-line arrows in FIG. 1, the signal charges of the even fields are transferred from the light-receiving portions 1 to the vertical transfer portions 2 and are likewise read out as video signals.

Accordingly, in such driving by the frame accumulation mode, the accumulation time of the signal charges of each field is 1/30 sec. However, each of the areas in V1–V4 of FIG. 2 in which two oblique lines intersect each other indicate a period of time during which a predetermined synchronous transfer pulse is generated.

However, in the driving by the frame accumulation mode, when a moving object is photographed, the video signals of the odd fields and the even fields overlap each other by one field and therefore, an unpleasant field afterimage is created.

In contrast, in the driving by the field accumulation mode wherein signal charges are accumulated in one picture element for one field period (1/60 sec.), the signal charges of all picture elements are read out for each field and the picture element signals of two horizontal lines vertically adjacent to each other are compositely read out and therefore, no field afterimage is created. Here, the light-receiving portions 1 are charge accumulation type photoelectric converting elements.

FIG. 3 of the accompanying drawings shows the movement of signal charges from the light-receiving portions 1 to the vertical transfer portions 2 by the field accumulation mode, for example, in an interline transfer CCD, and FIG. 4 of the accompanying drawings shows the timing chart thereof.

First, in the case of the odd fields, at the timing of times T2, T4, ... of FIG. 4, the signal charges of the light-receiving portions 1 of two adjacent horizontal lines which provide the odd fields are added together in the vertical transfer portions as indicated by solid-line arrows in FIG. 3, and in the case of the even fields, at the timing of times T1, T3, ... of FIG. 4, the signal charges of the light-receiving portions 1 of two adjacent horizontal lines which provide the even fields are added together in the vertical transfer portions 2 as indicated by broken-line arrows in FIG. 3 and are read out.

Accordingly, the signal charges of all picture elements are read out for each field and therefore, the accumulation time of the signal charges is 1/60 sec. and no field afterimage is created.

Now, the driving method by the field accumulation mode wherein the signal charges of two horizontal lines are combined together in this manner and video signals are read out, whereby the accumulation time of the signal charges is 1/60 sec. poses no problem even if the signal charges of two horizontal lines are combined together where black-and-white video signals and video color signals are to be obtained by the use of complementary color filters comprising cyan, magenta and yellow, and also permits separation of color information, but is inferior to primary color filters in the S/N ratio of color signals and color reproducibility. Also, stripe-like filters using primary colors cannot sufficiently obtain brightness signals and are inferior in resolution. On the other hand, where color video signals are to be obtained by the use of other primary color filters (for example, a primary color mosaic filter) than stripe-like primary color filters, the presence of the process of combining and reading out the signals of two horizontal lines gives rise to color mixture and such filters cannot be used and after all, only the driving by the frame accumulation mode can be applied, and this has led to the disadvantage that a field afterimage is created. This will hereinafter be described in more detail.

Consider a single-plate color television camera using a single interline transfer CCD having attached thereto other primary color filters than stripe-like primary color filters. Taking as an example a primary color filter of such an arrangement as shown in FIG. 5 of the accompanying drawings, each of light-receiving portions 1 has applied thereto color coatings indicated by R, B and G.

As is apparent from FIG. 5, in the read-out of even fields by the field accumulation mode, three primary colors of R, G and B signals are added together in the vertical transfer portions without any problem and without color mixture, but in the case of the odd fields, R signal and B signal are mixed in the vertical transfer portions and therefore, in this case, it becomes impossible to obtain R and B signals and after all, when use is made of other primary color filters than stripe-like primary color filters, it has been impossible to obtain color video signals in the driving method by the field accumulation mode.

SUMMARY OF THE INVENTION

It is an object of the present invention to provide an apparatus for driving a solid state image pickup device which is capable of driving by the field accumulation mode and can obtain video color signals free of afterimages.

To achieve the above object, in the present invention, the driving by the frame accumulation mode in which during each frame period, the signal charges of light-receiving portions are intactly transferred to vertical transfer portions and read out as video signals is the basis and in addition to this, prior to the transfer of the signal charges from the light-receiving portions effected during each frame period, unnecessary charges are transferred from the light-receiving portions to the vertical transfer portions within the vertical blanking period one field before and the unnecessary charges are swept out of the vertical transfer portions by a high-speed transferring operation, whereby overlapping of the accumulations of the signal charges of odd fields and even fields is prevented to thereby eliminate any field afterimage and obtain a video color signal in which the accumulation time is substantially 1/60 sec.

BRIEF DESCRIPTION OF THE DRAWINGS

FIG. 4 is a timing chart showing the driving by the field accumulation mode according to the prior art.

FIG. 7 is a block diagram of an embodiment of the present invention.

DESCRIPTION OF THE PREFERRED EMBODIMENT

Figure 1:
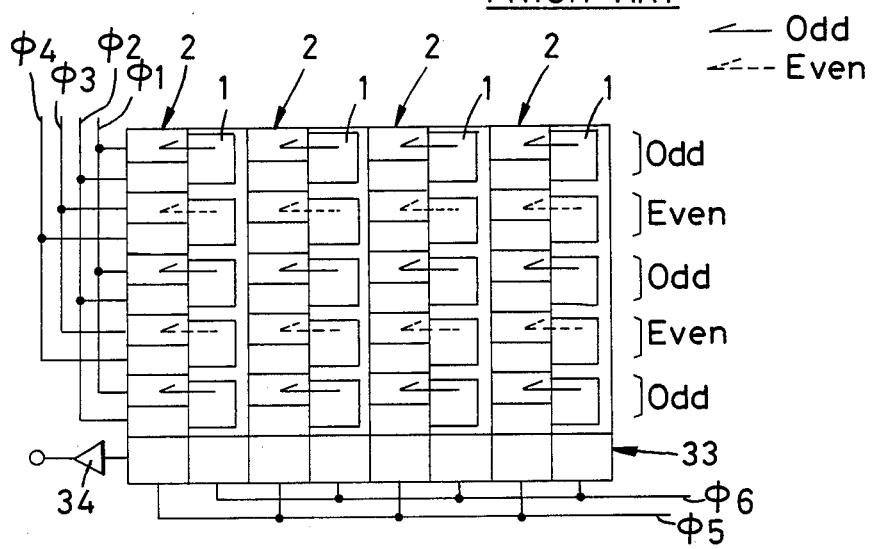
FIG. 1 is a plan view schematically showing the movement of signal charges by the frame accumulation mode according to the prior art and an interline transfer CCD.
Figure 3:
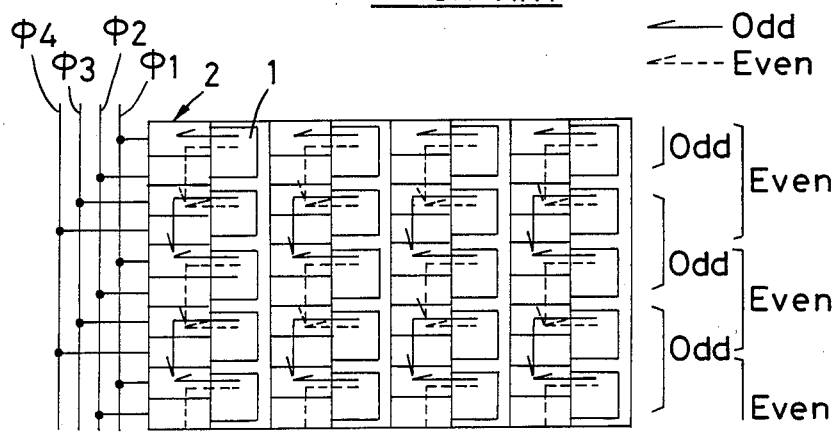
FIG. 3 is a plan view showing the movement of signal charges by the field accumulation mode according to the prior art.
Figure 2:
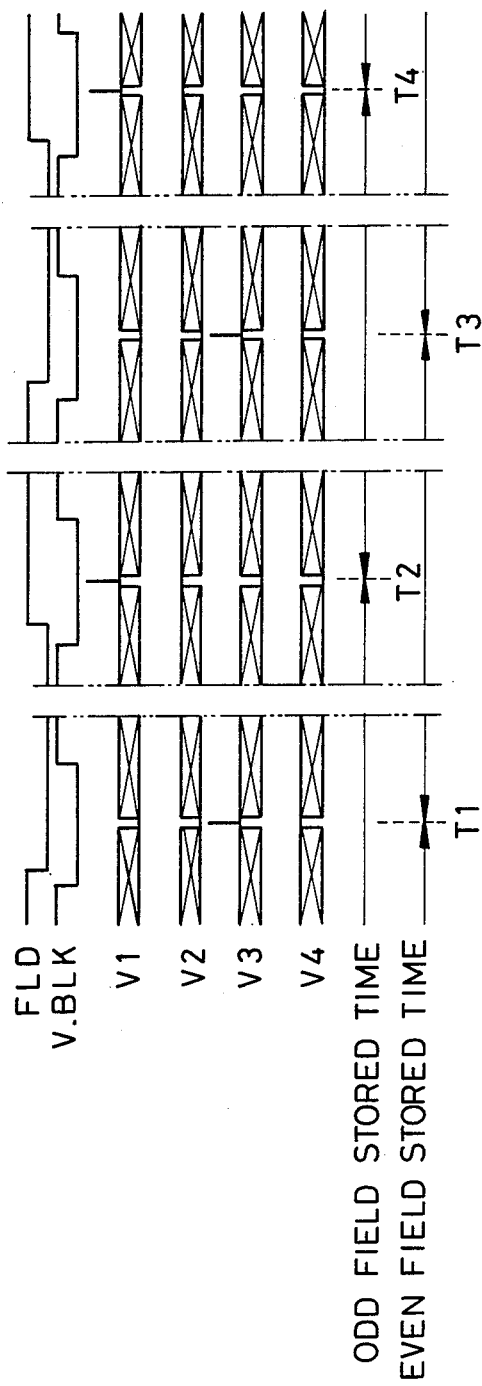
FIG. 2 is a timing chart showing the driving by the frame accumulation mode according to the prior art.
Figure 6:
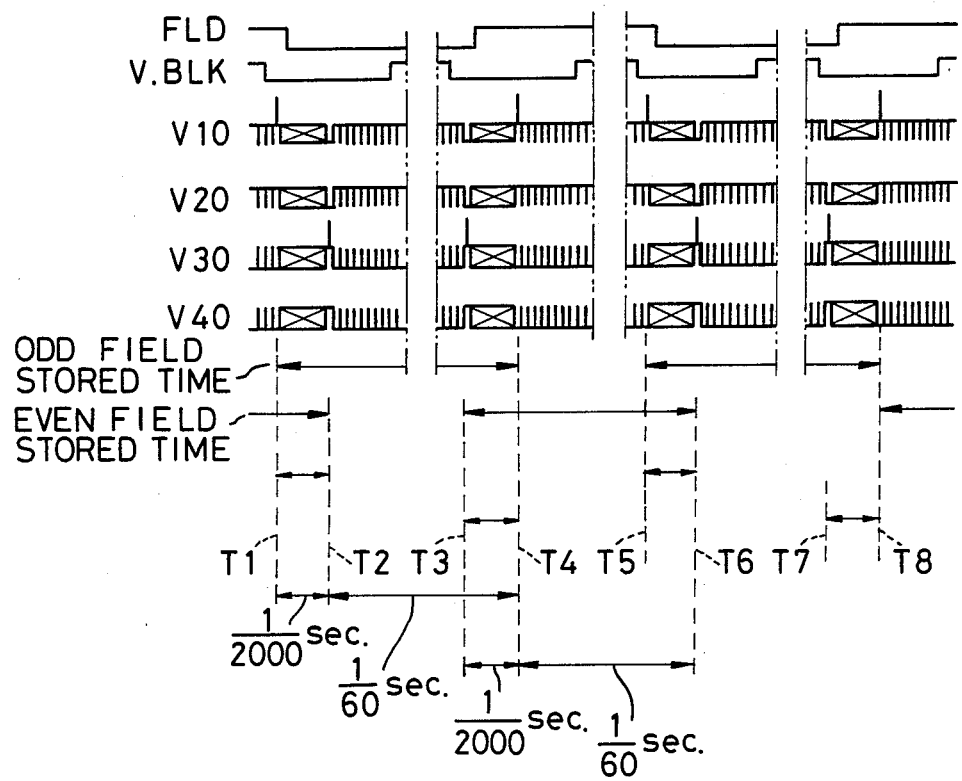
FIG. 6 is a time chart illustrating the principle of the present invention.
Figure 5:
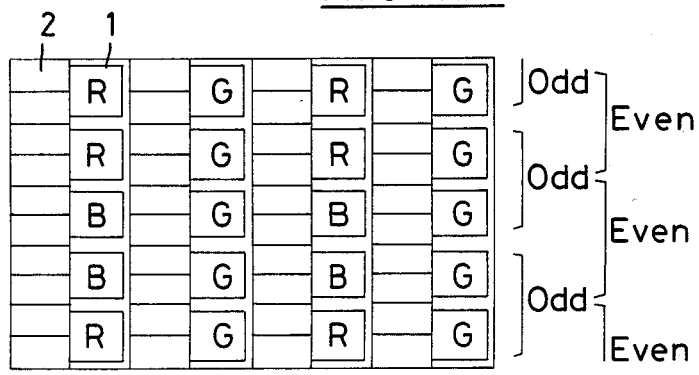
FIG. 5 is a plan view of an interline transfer CCD provided with primary color filters.

The driving of a solid state image pickup element shown in the timing chart of FIG. 6, like the driving by the frame accumulation mode of the interline transfer CCD shown in FIG. 1, is based on the operation of transferring a signal charge from each light-receiving portion 1 to each vertical transfer portion 2 during each frame period per signal charge of each field as shown in the timing chart of FIG. 2 without adding the signal charges of the light-receiving portions 1.

With such driving by the frame accumulation mode as the premise, in the driving of the present invention, in both of odd and even fields, the signal charges of the light-receiving portions 1 are once transferred as unnecessary charges, to the vertical transfer portions 2 during the vertical blanking period which is one field before the timing at which read-out of the signal charges is effected from the light-receiving portions to the vertical transfer portions during each frame period and the signal charges are swept out of the vertical transfer portions by high-speed sweeping-out operation, whereby the driving by the field accumulation mode which is substantially 1/60 sec. is realized.

This driving principle of the present invention will hereinafter be described with reference to the timing chart of FIG. 6.

In the timing chart of FIG. 6, V10–V40 represent electrode voltages corresponding to electrodes $\phi1$–$\phi4$ for transferring and driving a vertical transfer CCD.

Signal charges are first transferred from the light-receiving portions 1 to the vertical transfer portions 2 during each frame period. That is, with regard to the odd fields, the electrode voltage V10 of the electrode $\phi1$ of the vertical transfer portion corresponding to the light-receiving portion 1 of the odd field is rendered into the highest one of three levels at the timing of times T4, T8, ..., whereby the signal charges of the light-receiving portions 1 are transferred to the vertical transfer portions 2, whereafter they are read out as video signals by the normal operation durative for the odd field time. With regard also to the even fields, the electrode voltage V30 of the electrode $\phi3$ of the vertical transfer portion 2 corresponding to the light-receiving portion 1 of the even field is rendered into the highest one of three levels at the timing of each frame period which is times T2, T6, ..., whereby the signal charges of the even fields are read out from the light-receiving portions 1 to the vertical transfer portions 2 and are read out as video signals by the normal operation for the even field time thereafter.

In addition to such read-out of the video signal during each frame period corresponding to each field, in the driving apparatus of the present invention, prior to the transfer and read-out of the signal charge of the odd field, for example, at time T4, the electrode voltage V10 of the transfer electrode $\phi1$ corresponding to the odd field is rendered into the highest one of three levels at time T1 which is in the vertical blanking period, and the signal charges of the odd fields are transferred as unnecessary charges to the vertical transfer portions 2, whereafter high-speed sweep-out operation of the vertical transfer portions 2 is performed for times T1–T2, whereby the unnecessary charges are discharged outwardly. In FIG. 6, areas in which two oblique lines intersect each other indicate the period of time during which a transfer pulse of a shorter period than the normal vertical transfer pulse is generated.

By such sweep-out of the unnecessary charges of the odd fields between time T1 to time T2 during the vertical blanking period, the signal charges of the light-receiving portions 1 of the odd fields are eliminated at the timing of time T1, and accumulation of new signal charges is initiated from the timing of time T1, and at time T4 which reaches the frame period, the signal charges are read out as video signals by the same operation as the conventional frame accumulation mode.

Accordingly, the accumulation time of the signal charges in the odd fields extends from time T1 to time T4, and time T1 to T2 is of the order of 1/2000 sec. and time T4–T2 is 1/60 sec. which is one field time and therefore, the accumulation time of the signal charges from time T1 till time T4 is (1/2000+1/60) sec. and thus about 1/60 sec., and this is substantially equivalent to the fact that driving has been effected in the field accumulation mode.

When the read-out of the video signal during each frame period of the even fields at time T6 is taken as an example, the electrode voltage V30 of the electrode $\phi 3$ used for the transfer of the signal charges of the even fields is rendered into the highest one of three levels at time T3 in the vertical blanking period which is about one field before time T6 when the video signals are read out, and the signal charges accumulated from time T2 are transferred as unnecessary charges to the vertical transfer portions, and by the use of time T3 to time T4, the unnecessary charges are discharged outwardly by the high-speed sweeping-out operation of the vertical transfer portions. Thus, the video signals read out in the even field initiated at the timing of time T6 are the signal charges obtained during the accumulation time from time T3 till time T6, and as in the case of the odd fields, the time T3–T4 is of the order of 1/2000 sec. and the time T4–T6 is 1/60 sec. and therefore, the accumulation time of the signal charges which is T3–T6 is about 1/60 sec., and this is substantially equivalent to the fact that driving has been effected in the field accumulation mode. The video signals swept out as the unnecessary charges from the vertical transfer portions by the high-speed sweeping-out operation during the times T1–T2, T3–T4, T5–T6, T7–T8, ... are in the vertical blanking period during which a vertical blanking signal V.BLK is in L state, and therefore will not appear on the picture plane even if they are not subjected to extraneous signal processing and thus, there is no problem of the image deterioration resulting from the high-speed sweep-out of the unnecessary charges.

Also, the video signals are read out in the driving by the field accumulation mode in which each of the odd fields and the even fields is about 1/60 sec. and therefore, no field afterimage will occur even if any moving object is photographed.

In FIG. 7, a driving signal generator 3 is responsive to a reference clock signal CLK generated by a crystal oscillator or the like to generate a frame synchronizing signal FLD, a transfer gate pulse TG, vertical transfer pulses V1', V2, V3', V4, a horizontal transfer pulse HI for driving the horizontal transfer portion of the solid state image pickup device, a horizontal blanking signal H.BLK and a vertical blanking signal V.BLK. A monostable multivibrator (hereinafter referred to as M.M) 4 is responsive to the falling of V.BLK to put out to an inverter 30 a signal S1 which assumes H level for a predetermined period of time. M.M 13 is responsive to the output of the inverter 30 to generate a signal S3, and M.M 14 is responsive to the signal S3 to generate a signal S4. D flip-flop 5 is responsive to the output of the inverter 30 and the output V1' of the generator 3 to put out a signal S2. A counter 7 counts the pulse V1', and D flip-flop 6 is responsive to the output of the D flip-flop 5 and the output of the counter 7 to generate a signal S5. An AND gate 8 puts out a pulse HI to JK flip-flop 9 during the period during which the signal S5 is at H level. The JK flip-flop 9 is responsive to M.BLK to frequency-divide a signal S9 and put out signals S10 and S11. JK flip-flop 10 frequency-divides the signal S11 and generates signals S12 and S14, and JK flip-flop 11 frequency-divides the signal S10 and generates signals S13 and S15. An inverter 15, AND gates 17, 18, 19 and 20 and OR gates 21 and 22 make signals S6 and S7 for discharging signal charges from the light-receiving portions 1, in accordance with signals S4, TG and FLD. A bias circuit 31 increases a voltage applied to a buffer 28 during the period during which the signal S6 is at H level, whereby the buffer 28 renders the output of an AND gate 27 into the highest one of three levels. A bias circuit 32 is responsive to the signal S7 to operate for a buffer 29 like the bias circuit 31. An AND gate 12 receives the signals S2 and FLD and puts out a signal S8. The AND gate 27 receives the signal S12, the pulse A1' and the output of inverter 23, an AND gate 26 receives the signal S13, the pulse V2 and the output of inverter 23, an OR gate 25 receives the signal S14, the pulse V3' and the signal S8, and an OR gate 24 receives the signal S15, the pulse V4 and the signal S8.

The driving signal generator 3 is a conventional signal generator.

The periods during which the signals S3 and S4 and transfer gate pulse TG are at H level are set to a value shorter than the period of the normal vertical transfer pulse, e.g., pulse V1'.

Figure 8:
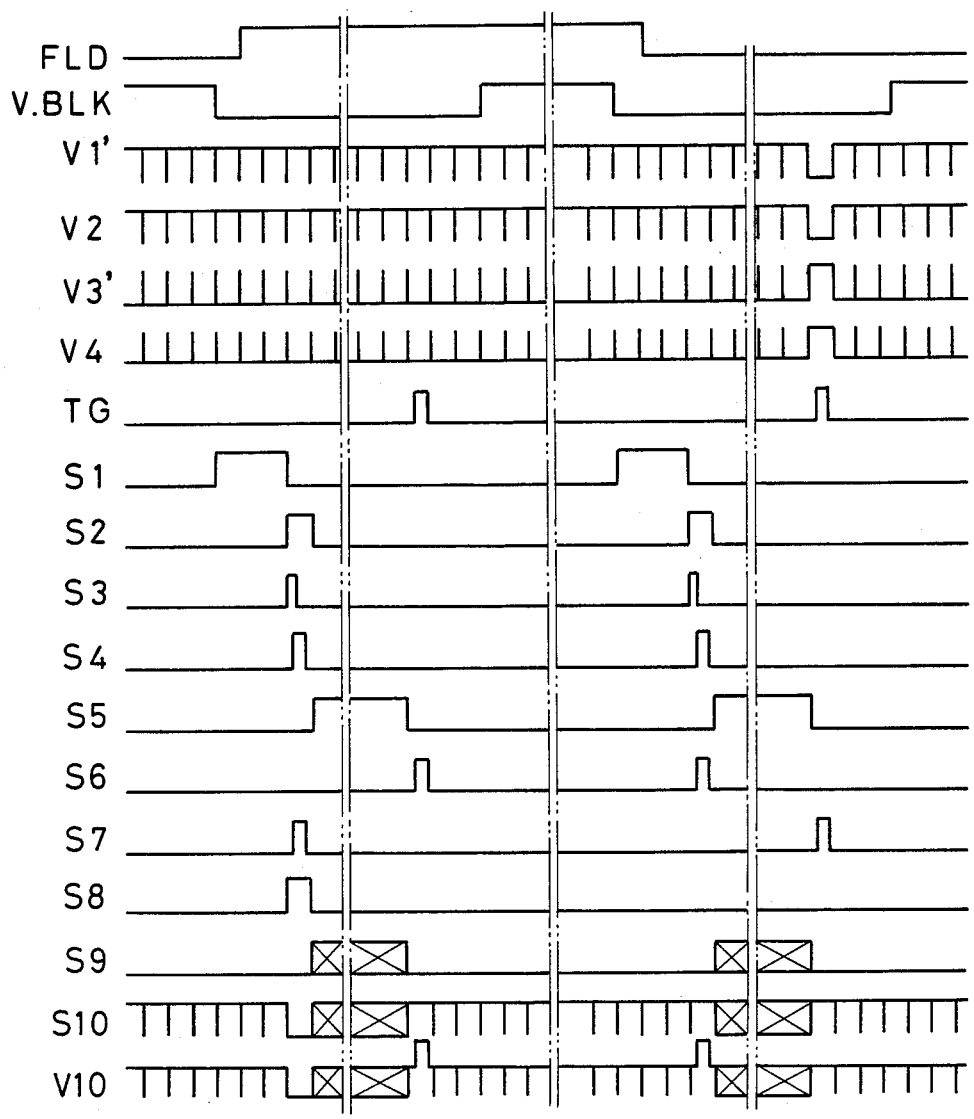
FIGS. 8 and 9 are time charts showing the operation of an embodiment of the present invention.
Figure 9:
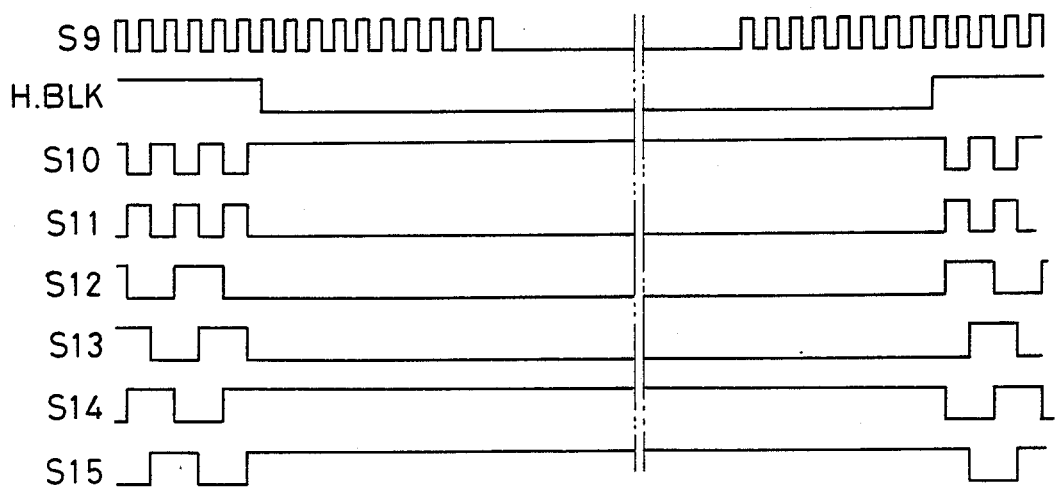

The operations of the various circuits shown in FIG. 7 are illustrated in the time charts of FIGS. 8 and 9.

The signal V1 comprises a combination of the pulse V1' and the transfer gate pulse TG, and the signal V3 also comprises a combination of the pulse V3' and the transfer gate pulse TG.

Signals V10, V20, V30 and V40 are applied to the electrodes $\phi 1$, $\phi 2$, $\phi 3$, and $\phi 4$, respectively, of the solid state image pickup element shown in FIG. 1.

We claim:

1. An apparatus for making a video signal, including:
   (a) solid state image pickup means having a plurality of first charge accumulation type photoelectric converting elements corresponding to the odd fields of the video signal, a plurality of second charge accumulation type photoelectric converting elements corresponding to the even fields of the video signal, vertical transfer means, horizontal transfer means, first terminal means and second terminal means, said solid state image pickup means being responsive to the inputting of a pulse to said first terminal means to transfer charges accumulated by said plurality of first photoelectric converting elements to said vertical transfer means, said solid state image pickup means being responsive to the inputting of a pulse to said second terminal means to transfer charges accumulated by said plurality of second photoelectric converting elements to said vertical transfer means;
   (b) output means for putting out a vertical blanking signal indicative of the vertical blanking period of the video signal, a first transfer pulse and a second transfer pulse, said output means putting out said first and second transfer pulses during said vertical blanking period so that said second transfer pulse is put out after the lapse of a predetermined period of time subsequent to the outputting of said first transfer pulse;
   (c) input means for alternately inputting said first and second transfer pulses to said first and second terminal means during each vertical blanking period; and (d) generator means for putting out a plurality of first driving pulses and a plurality of second driving pulses to said vertical transfer means, the period of said first driving pulse being shorter than the period of said second driving pulse, said generator means generating said plurality of first driving pulses within said predetermined period of time and generating said plurality of second driving pulses without said predetermined period of time, said vertical transfer means being responsive to said plurality of first driving pulses and said plurality of second driving pulses to transfer charges to said horizontal transfer means, and wherein said generator means puts out a plurality of horizontal driving pulses for driving said horizontal transfer means and has means for frequency-dividing said plurality of horizontal driving pulses.

2. An apparatus according to claim 1, wherein said frequency-dividing means frequency-divides said plurality of horizontal driving pulses and puts out said frequency divided plurality of horizontal driving pulses as said plurality of first driving pulses.

3. An apparatus for driving a solid state image pickup device having a plurality of charge accumulation type photoelectric converting elements, vertical transfer means and horizontal transfer means and making a video signal, including:

(a) output means for putting out a first transfer signal and a second transfer signal sequentially within each vertical blanking period of the video signal, said solid state image pickup device being responsive to said first transfer signal to transfer to said vertical transfer means charges accumulated by said plurality of photoelectric converting elements corresponding to the odd fields of said video signal, said solid state image pickup device being responsive to said second transfer signal to transfer to said vertical transfer means charges accumulated by said plurality of photoelectric converting elements corresponding to the even fields of said video signal;

(b) control means for reversing the sequential order of the time when said first transfer signal is output and the time when said second transfer signal is output during successive vertical blanking periods; and (c) driving means adapted to put out a plurality of first driving pulses for driving said vertical transfer means, said driving means putting out a plurality of second driving pulses different from said plurality of first driving pulses during each said vertical blanking period within the period of time between the outputting of said first transfer signal and the outputting of said second transfer signal, said driving means being responsive to said plurality of first driving pulses and said plurality of second driving pulses to transfer the charges to said horizontal transfer means.

4. An apparatus according to claim 3, wherein the period of said first driving pulse is shorter than the period of said second driving pulse.

5. An apparatus according to claim 3, wherein said driving means puts out a plurality of horizontal driving pulses for driving said horizontal transfer means and has means for frequency-dividing said plurality of horizontal driving pulses.

6. An apparatus according to claim 5, wherein said frequency-dividing means frequency-divides said plurality of horizontal driving pulses and puts out said frequency-divided plurality of horizontal driving pulses as said plurality of first driving pulses.

* * * * *